United States Patent
Palisch et al.

(10) Patent No.: US 12,091,944 B2
(45) Date of Patent: Sep. 17, 2024

(54) GRAVEL PACK PARTICLES CONTAINING MUD FILTER CAKE DISSOLVING MATERIALS

(71) Applicant: CARBO CERAMICS INC., Houston, TX (US)

(72) Inventors: Terrence Palisch, Richardson, TX (US); Joshua Leasure, Houston, TX (US); Todd Roper, Katy, TX (US); Nicolas Lopez, Fulshear, TX (US)

(73) Assignee: CARBO CERAMICS INC., Houston, TX (US)

( * ) Notice: Subject to any disclaimer, the term of this patent is extended or adjusted under 35 U.S.C. 154(b) by 10 days.

(21) Appl. No.: 18/097,800

(22) Filed: Jan. 17, 2023

(65) Prior Publication Data

US 2023/0167721 A1    Jun. 1, 2023

Related U.S. Application Data

(63) Continuation of application No. 16/776,334, filed on Jan. 29, 2020, now Pat. No. 11,572,769.

(60) Provisional application No. 62/798,471, filed on Jan. 29, 2019.

(51) Int. Cl.
| | |
|---|---|
| *E21B 43/04* | (2006.01) |
| *C09K 8/536* | (2006.01) |
| *C09K 8/56* | (2006.01) |
| *E21B 33/12* | (2006.01) |

(52) U.S. Cl.
CPC .............. *E21B 43/04* (2013.01); *C09K 8/536* (2013.01); *C09K 8/56* (2013.01); *E21B 33/1208* (2013.01); *C09K 2208/26* (2013.01)

(58) Field of Classification Search
None
See application file for complete search history.

(56) References Cited

U.S. PATENT DOCUMENTS

| | | | |
|---|---|---|---|
| 2006/0078682 | A1 | 4/2006 | McDaniel et al. |
| 2008/0230223 | A1 | 9/2008 | McCrary et al. |
| 2010/0065271 | A1 | 3/2010 | McCrary et al. |
| 2010/0216672 | A1* | 8/2010 | Todd ................. C09K 8/516 507/239 |
| 2016/0083644 | A1 | 3/2016 | Ogle et al. |
| 2016/0137911 | A1 | 5/2016 | Sherman et al. |
| 2016/0153273 | A1 | 6/2016 | Nguyen et al. |
| 2017/0114267 | A1* | 4/2017 | Lahman ............. C09K 8/516 |
| 2017/0198214 | A1* | 7/2017 | Lieng ................. E21B 43/04 |
| 2017/0313931 | A1* | 11/2017 | Chopade ............ E21B 43/26 |
| 2018/0306027 | A1 | 10/2018 | Sherman et al. |
| 2019/0144738 | A1* | 5/2019 | Agrawal ............ C09K 8/605 166/280.2 |
| 2019/0352559 | A1* | 11/2019 | Vo ..................... C09K 8/64 |

* cited by examiner

*Primary Examiner* — John J Figueroa
(74) *Attorney, Agent, or Firm* — Whitaker Chalk Swindle & Schwartz PLLC; Enrique Sanchez, Jr.

(57) ABSTRACT

A gravel pack containing a substrate particle coated with an inducibly degradable and a porous particle having an internal interconnected porosity that is at least partially infused with an inducer material for dissolving of a layer of filter cake disposed between the gravel pack and a subterranean formation.

11 Claims, 2 Drawing Sheets

GRAVEL PACK PARTICLES CONTAINING MUD FILTER CAKE DISSOLVING MATERIALS

CROSS-REFERENCE TO RELATED APPLICATIONS

This application is a continuation of U.S. patent application Ser. No. 16/776,334, filed on Jan. 29, 2020, which claims priority to U.S. Provisional Application No. 62/798,471, filed on Jan. 29, 2019, all of which are herein incorporated by reference in their entireties.

BACKGROUND

Openhole well completions are oftentimes utilized in the oil and gas industry in efforts to maximize well production by eliminating opportunities for pressure drop caused by casing perforations. In drilling and completing such openhole wells, drilling fluids are used for, inter alia, preventing fluid loss from a subterranean formation surrounding a wellbore during drilling and/or completion of the openhole wellbore. In such applications, the drilling fluids can be forced against the open formation thereby creating an impermeable residue known as filter cake on the formation. The presence of a filter cake may be desirable in certain wells to prevent fluid loss to and/or from the formation. Once the openhole well is completed, such filter cakes are removed so that production may begin. This is accomplished by pumping a chemical wash downhole to contact and hopefully dissolve the filter cake.

Sometimes, a wellbore will need to be "gravel packed" before removal of the filter cake in order to prevent particles (typically referred to as formation fines) from entering the wellbore during production. Gravel packing is done in formations that contain individual sand grains that are not tightly cemented together. If the individual sand grains remain unconsolidated, when production of the formation begins, the force of fluid flow will tend to move the unconsolidated sand grains into the wellbore. Gravel packing prevents this problem. In gravel packing, particulate materials, including proppants, are placed in the annulus of a wellbore, next to the unconsolidated formation fines, essentially working as a filter between the wellbore and the formation during production. The particulate materials are held in place by a slotted screen which prevents the proppants (and formation fines) from migrating into the wellbore, while still allowing the formation fluids to do so. Oftentimes, however, the presence of the gravel pack can prevent the chemical wash from reaching all of the filter cake, resulting in incomplete filter cake removal, which can negatively impact production. Therefore, a need exists for improved filter cake removal when a gravel pack is present in the wellbore.

BRIEF SUMMARY

A gravel pack particle is disclosed. The gravel pack particle can include a filter cake breaker coated onto and/or infused into a porosity of the gravel pack particle.

A gravel pack composition is also disclosed. The gravel pack composition can include a plurality of gravel pack particles having a first portion and a second portion. The first portion of the gravel pack particles can include a first substrate particle and a filter cake breaker coated on the first substrate particle. The second portion can include a second substrate particle and an inducer coated on the substrate particle.

A gravel pack assembly is also disclosed. The gravel pack assembly can include a substrate particle coated with an inducibly degradable material, such as a polyacetal, and a porous particle having an internal interconnected porosity that can be at least partially infused with an inducer material such as sulfur dioxide, brines, or sulfonic acids or combinations thereof. The gravel pack can include a blend of the substrate particle and the porous particle and can be circumferentially disposed about a perforated section of a tubular, the gravel pack comprising a blend of the substrate particle and the porous particle. The gravel pack assembly can also include a layer of filter cake disposed between the gravel pack and a subterranean formation.

BRIEF DESCRIPTION OF THE DRAWINGS

The present disclosure may best be understood by referring to the following description and accompanying drawings that are used to illustrate embodiments of the present disclosure. In the drawings.

DETAILED DESCRIPTION

Figure 1:
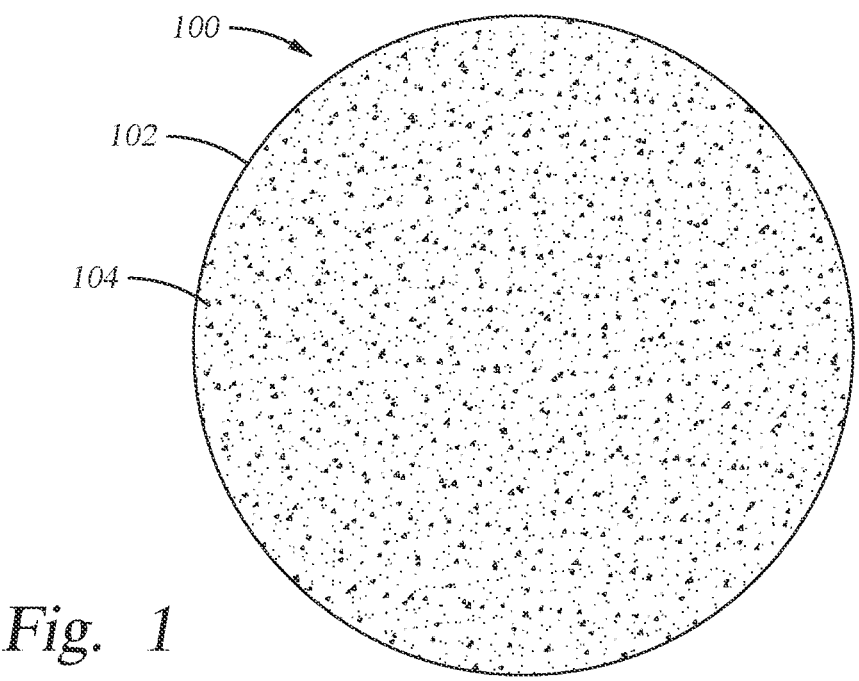
FIG. 1 illustrates a cross-sectional view a gravel pack particle, according to an embodiment.

Disclosed herein are gravel pack particles containing one or more filter cake dissolving materials, or filter cake breakers. FIG. 1 illustrates a cross-sectional view of a gravel pack particle 100. The gravel pack particle 100 can include a substrate particle 102 and a filter cake breaker 104. As used herein, the term "filter cake breaker" refers to material that is capable of dissolving, degrading, or otherwise breaking down filter cake material in a downhole environment. The filter cake breaker 104 can be infused/disposed into one or more pores of the substrate particle 102. For example, the filter cake breaker 104 can be substantially homogenously distributed throughout an internal interconnected porosity of the substrate particle 102. In one or more embodiments (not shown), the filter cake breaker 104 can be coated onto an outer surface of the substrate particle 102 so that the filter cake breaker 104 at least partially surrounds the substrate particle 102.

The substrate particle 102 can include any suitable gravel pack particle. For example, the substrate particle 102 can be or include sand, ceramic proppant, diatomaceous earth, walnut hulls, glass beads, resin coated sand, plastic beads, and other ceramic or resin coated proppants. Such particles can be manufactured according to any suitable process including, but not limited to continuous spray atomization, spray fluidization, drip casting, spray drying, or compression. Suitable substrate particles 102 and methods for manufacture are disclosed in U.S. Pat. Nos. 4,068,718, 4,427,068, 4,440,866, 5,188,175, 7,036,591, 8,865,631, 8,883,693, 9,175,210, 9,670,400, 10,077,395, 10,077,398, and 10,118,863, the entire disclosures of which are incorporated herein by reference. In one or more embodiments, the substrate particle 102 can be formed from finely divided minerals, fibers, ground almond shells, ground walnut shells, ground coconut shells, activated carbon, coal, petroleum coke, calcined coke, silica particulates, precipitated silicas, silica (quartz sand), cristobalite, mullite, alumina, silica-alumina, silica gel, mica, silicate, e.g., orthosilicates or metasilicates, calcium silicate, bauxite, kaolin, talc, zirconia, boron, fly ash, zeolites, diatomaceous earth, fuller's earth, and organic synthetic high molecular weight water-insoluble adsorbents and combinations thereof.

The substrate particle 102 can contain silica and/or alumina in any suitable amounts. According to one or more embodiments, the substrate particle 102 includes less than 80 wt %, less than 60 wt %, less than 40 wt %, less than 30 wt %, less than 20 wt %, less than 10 wt %, or less than 5 wt % silica based on the total weight of the substrate particle 102. According to one or more embodiments, the substrate particle 102 includes from about 0.1 wt % to about 70 wt % silica, from about 1 wt % to about 60 wt % silica, from about 2.5 wt % to about 50 wt % silica, from about 5 wt % to about 40 wt % silica, or from about 10 wt % to about 30 wt % silica. According to one or more embodiments, the substrate particle 102 includes at least about 30 wt %, at least about 50 wt %, at least about 60 wt %, at least about 70 wt %, at least about 80 wt %, at least about 90 wt %, or at least about 95 wt % alumina based on the total weight of the substrate particle 102. According to several exemplary embodiments, the substrate particle 102 includes from about 30 wt % to about 99.9 wt % alumina, from about 40 wt % to about 99 wt % alumina, from about 50 wt % to about 97 wt % alumina, from about 60 wt % to about 95 wt % alumina, or from about 70 wt % to about 90 wt % alumina.

The substrate particle 102 can have any suitable apparent specific gravity (ASG). The term "apparent specific gravity," as used herein, is the weight per unit volume (grams per cubic centimeter) of the particle, including the internal porosity. The apparent specific gravity values given herein were determined by the Archimedes method of liquid (water) displacement according to API RP60, a method which is well known to those of ordinary skill in the art. The substrate particle 102 can have an apparent specific gravity of at least about 1.5 g/cc, at least about 1.7 g/cc, at least about 1.9 g/cc, at least about 2.1 g/cc, at least about 2.3 g/cc, at least about 2.5 g/cc, at least about 2.7 g/cc, at least about 3 g/cc, at least about 3.3 g/cc, or at least about 3.5 g/cc. In one or more embodiments, the substrate particle 102 can have an apparent specific gravity of less than 4 g/cc, less than 3.5 g/cc, less than 3 g/cc, less than 2.75 g/cc, less than 2.5 g/cc, or less than 2.25 g/cc. For example, the substrate particle 102 can have an apparent specific gravity of about 1.6 g/cc to about 3.8 g/cc, about 1.8 g/cc to about 3.2 g/cc, about 2.0 g/cc to about 2.7 g/cc, about 2.4 g/cc to about 2.9 g/cc, or about 3 g/cc to about 4 g/cc.

A plurality of substrate particles 102 can have any suitable bulk density. As used herein, the term "bulk density" refers to the weight per unit volume (grams per cubic centimeter) of a plurality of objects including the void spaces between the particles in the volume considered. In one or more embodiments, the substrate particles 102 have a bulk density of less than 3 g/cc, less than 2.5 g/cc, less than 2.2 g/cc, less than 2 g/cc, less than 1.8 g/cc, less than 1.6 g/cc, or less than 1.5 g/cc. The substrate particles 102 can have a bulk density of about 0.05 g/cc, about 0.5 g/cc, about 1 g/cc, about 1.15 g/cc, about 1.25 g/cc, about 1.35 g/cc, or about 1.45 g/cc to about 1.5 g/cc, about 1.6 g/cc, about 1.75 g/cc, about 1.9 g/cc, or about 2.1 g/cc or more. For example, the substrate particles 102 can have a bulk density of about 1.3 g/cc to about 1.8 g/cc, about 1.35 g/cc to about 1.65 g/cc, or about 1.5 g/cc to about 1.9 g/cc.

The porous substrate particle 102 can have any suitable porosity. The substrate particle 102 can have an internal interconnected porosity from about 1%, about 2%, about 4%, about 6%, about 8%, about 10%, about 12%, or about 14% to about 18%, about 20%, about 22%, about 24%, about 26%, about 28%, about 30%, about 34%, about 38%, about 45%, about 55%, about 65%, or about 75% or more. The term "internal interconnected porosity," as used herein, is defined as a percentage of the pore volume, or void volume space, over the total volume of a porous particulate. In several exemplary embodiments, the internal interconnected porosity of the substrate particle 102 is from about 5% to about 75%, about 5% to about 15%, about 10% to about 30%, about 15% to about 35%, about 25% to about 45%, about 30% to about 55%, or about 35% to about 70%. According to several exemplary embodiments, the substrate particle 102 can have any suitable average pore size. For example, the substrate particle 102 can have an average pore size from about 2 nm, about 10 nm, about 15 nm, about 55 nm, about 110 nm, about 520 nm, or about 1,100 to about 2,200 nm, about 5,500 nm, about 11,000 nm, about 17,000 nm, or about 25,000 nm or more in its largest dimension. For example, the substrate particle 102 can have an average pore size can be from about 3 nm to about 30,000 nm, about 30 nm to about 18,000 nm, about 200 nm to about 9,000, about 350 nm to about 4,500 nm, or about 850 nm to about 1,800 nm in its largest dimension.

The substrate particle 102 can have any suitable size. The substrate particle 102 can have a size of at least about 100 mesh, at least about 80 mesh, at least about 60 mesh, at least about 50 mesh, or at least about 40 mesh. For example, the substrate particle 102 can have a size from about 115 mesh to about 2 mesh, about 100 mesh to about 3 mesh, about 80 mesh to about 5 mesh, about 60 mesh to about 10 mesh, about 50 mesh to about 12 mesh, about 40 mesh to about 8 mesh, about 35 mesh to about 10 mesh, or about 30 mesh to about 14 mesh.

The filter cake breaker 104 can be or include any suitable material capable of dissolving filter cake material. The filter cake breaker 104 can include acid generating compounds, enzymes, oxidizers, bromates (such as sodium bromate and potassium bromate), and azo compounds and combinations thereof. In one or more embodiments, the filter cake breaker 104 can include acid generating compounds including, but not limited to, esters, aliphatic polyesters, ortho esters, poly (ortho esters), ortho ethers, poly (ortho ethers), lactides, poly(lactides), glycolides, poly(glycolides), lactones, hydroxybutyrates, poly(hydroxybutyrates), anhydrides, poly (anhydrides), polyascorbic acid, aliphatic carbonates, aliphatic polycarbonates, amino acids, poly(amino acids), ethylene oxide, poly(ethylene oxide), polyphosphazenes, or combinations thereof.

In one or more embodiments, the filter cake breaker 104 can include may be or include, but is not limited to, long chain alcohols, phenol derivatives, fatty esters, an acid selected from the group of citric acid, oleic acid, tartaric acid, stearic acid, linoleic acid, linolenic acid, aromatic dicarboxylic acids, oxalic acid, malonic acid, succinic acid, glutaric acid, glutamic acid, boric acid, adipic acid, a diacid, a triacid, and a tetraacid, and combinations thereof. The long chain alcohol can be any alcohol having at least 8 carbons. The phenol derivatives can be or include, but are not limited to alkyl phenol ethoxylate, alkyl phenol salts, and combinations thereof. The diacid can be a polycarboxylic diacid, such as but not limited to [N-(1,2-dicarboxyethylene)D,L asparagine acid] (IDS), polyaspartic acid (DS), ethylenediamine-disuccinic acid (EDDS), [N,N-bis(carboxylmethyl) L-glutamic acid] (GLDA), methylglycinediacetic acid (MGDA), salts thereof, derivatives thereof, and combinations thereof. The tetraacid can be ethylenediaminetetraacetic acid (EDTA), hydroxyl-ethylenediaminetetraacetic acid (HEDTA), and the like.

In one or more embodiments, the filter cake breaker 104 can include a peroxide source, such as peroxide compounds of zinc or alkaline earth metals. In one or more embodiments, the filter cake breaker 104 can be or include one or more of the filter cake breakers and/or acid producing compounds described in U.S. Pat. Nos. 9,656,233 and 10,125,305 and U.S. Pre-Grant Publication Nos. 2016/0130497, 2016/0362596, and 2018/0155601, the relevant disclosures of which are incorporated herein by reference.

In one or more embodiments, the filter cake breaker 104 can be or include the inducibly degradable compositions described in U.S. Pre-Grant Publication No. 2018/0105730, the relevant disclosure of which is incorporated herein by reference. As used herein, the term "inducibly degradable" refers to materials that are stable to aqueous hydrolysis until they are induced to degrade. The filter cake breaker 104 can be or include a polyacetal. In one or more embodiments, the polyacetal is a co-polymer of trioxane and ethylene oxide. In an embodiment, the polyacetal is a polyoxymethylene (POM). The polyacetal can have a melting point temperature from about 150° C. to about 185° C., from about 175° C. to about 181° C., or from about 162° C. to about 173° C. The polyacetal can have a molecular weight (MW) from about 10,000 to about 60,000, from about 30,000 to about 50,000, or from about 37,000 to about 45,000.

In certain embodiments, the inducibly degradable materials may be induced to degrade by reacting them with an inducer. As used herein, the term "inducer" refers to material that is capable of inducing an inducibly degradable material to degrade. Examples of suitable inducers include sulfur dioxide, brines, sulfonic acids, and strong acids such as alpha-hydroxy sulfonic acids. In one or more embodiments, additional gravel pack particles can contain the inducer component of U.S. Pre-Grant Publication No. 2018/0105730, the relevant disclosure of which is incorporated herein by reference. For example, the inducer can be infused into one or more pores of a porous substrate, such as another substrate particle 102, to provide inducer particles. For example, the inducer can be substantially homogenously distributed throughout an internal interconnected porosity of a substrate particle. In one or more embodiments, the inducer can be coated onto an outer surface of a substrate particle so that the inducer at least partially surrounds the substrate particle. The inducer particles can be blended with gravel pack particles 100 in any suitable amounts or concentrations to provide a gravel pack as described herein.

Figure 2:
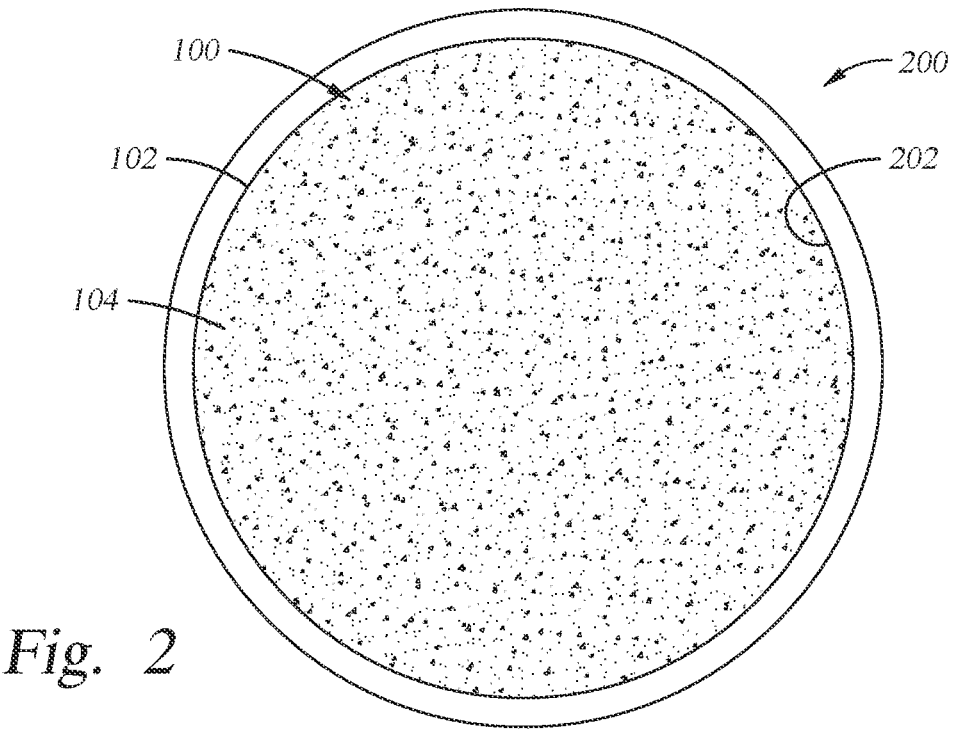
FIG. 2 illustrates a cross-sectional view a gravel pack particle having an outer coating, according to an embodiment.

FIG. 2 illustrates a cross-sectional view a gravel pack particle 200 having a coating 202. The coating 202 can coat, encapsulate, or otherwise surround the gravel pack particle 100 to provide the gravel pack particle 200. The coating 202 can be semi-permeable and substantially non-degradable in the presence of well fluid(s) but can permit the filter cake breaker 104 and/or the inducer to leach, elute, diffuse, bleed, discharge, desorb, dissolve, drain, seep, or otherwise leak through the polymeric coating 202 so as to release the filter cake breaker 104 and/or the inducer into the surrounding well fluid(s). The amount and molecular weight of the semi-permeable substantially non-degradable polymeric coating 202 can be varied to provide for longer or shorter release times for tailored release of the filter cake breaker 104 and/or the inducer.

The semi-permeable substantially non-degradable polymeric coating 202 can be or include a resin material and/or an epoxy resin material. For example, the resin material can include a phenolic resin, such as a phenol-formaldehyde resin. According to one or more embodiments, the phenol-formaldehyde resin has a molar ratio formaldehyde to phenol of less than 1:1, less than 0.9:1, less than 0.8:1, less than 0.7:1, less than 0.6:1, or less than 0.5:1. For example, the phenol-formaldehyde resin can be or include a phenolic novolac resin. Phenolic novolac resins are well known to those of ordinary skill in the art, for instance see U.S. Pat. No. 2,675,335 to Rankin, U.S. Pat. No. 4,179,429 to Hanauye, U.S. Pat. No. 5,218,038 to Johnson, and U.S. Pat. No. 8,399,597 to Pullichola, the entire disclosures of which are incorporated herein by reference. Suitable examples of commercially available novolac resins include novolac resins available from Plenco™, Durite® resins available from Momentive, and novolac resins available from S.I. Group.

According to several exemplary embodiments, the phenol-formaldehyde resin has any suitable viscosity. The phenol-formaldehyde resin can be a solid or liquid at 25° C. For example, the viscosity of the phenol-formaldehyde resin can be from about 1 centipoise (cP), about 100 cP, about 250 cP, about 500 cP, or about 700 cP to about 1,000 cP, about 1,250 cP, about 1,500 cP, about 2,000 cP, or about 2,200 cP at a temperature of about 25° C. In another example, the phenol-formaldehyde resin can have a viscosity from about 1 cP to about 125 cP, about 125 cP to about 275 cP, about 275 cP to about 525 cP, about 525 cP to about 725 cP, about 725 cP to about 1,100 cP, about 1,100 cP to about 1,600 cP, about 1,600 cP to about 1,900 cP, or about 1,900 cP to about 2,200 cP at a temperature of about 25° C. In another example, the phenol-formaldehyde resin can have a viscosity from about 1 cP to about 45 cP, about 45 cP to about 125, about 125 cP to about 550 cP, about 550 cP to about 825 cP, about 825 cP to about 1,100 cP, about 1,100 cP to about 1,600 cP, or about 1,600 cP to about 2,200 cP at a temperature of about 25° C. The viscosity of the phenol-formaldehyde resin can also be from about 500 cP, about 1,000 cP, about 2,500 cP, about 5,000 cP, or about 7,500 cP to about 10,000 cP, about 15,000 cP, about 20,000 cP, about 30,000 cP, or about 75,000 cP at a temperature of about 150° C. For example, the phenol-formaldehyde resin can have a viscosity from about 750 cP to about 60,000 cP, about 1,000 cP to about 35,000 cP, about 4,000 cP to about 25,000 cP, about 8,000 cP to about 16,000 cP, or about 10,000 cP to about 12,000 cP at a temperature of about 150° C. The viscosity of the phenol-formaldehyde resin can be determined using a Brookfield viscometer.

According to several exemplary embodiments, the phenol-formaldehyde resin can have pH from a low of about 1, about 2, about 3, about 4, about 5, about 6, about 7 to a high of about 8, about 9, about 10, about 11, about 12, or about 13. For example, the phenol-formaldehyde resin can have a pH from about 1 to about 2.5, about 2.5 to about 3.5, about 3.5 to about 4.5, about 4.5 to about 5.5, about 5.5 to about 6.5, about 6.5 to about 7.5, about 7.5 to about 8.5, about 8.5 to about 9.5, about 9.5 to about 10.5, about 10.5 to about 11.5, about 11.5 to about 12.5, or about 12.5 to about 13.

In one or more embodiments, the coating 202 is an epoxy resin. The epoxy resin can include bisphenol A, bisphenol F, aliphatic, or glycidylamine epoxy resins, and any mixtures or combinations thereof. An example of a commercially available epoxy resin is BE188 Epoxy Resin, available from Chang Chun Plastics Co., Ltd.

According to one or more embodiments, the epoxy resin can have any suitable viscosity. The epoxy resin can be a solid or liquid at 25° C. For example, the viscosity of the epoxy resin can be from about 1 cP, about 100 cP, about 250 cP, about 500 cP, or about 700 cP to about 1,000 cP, about 1,250 cP, about 1,500 cP, about 2,000 cP, or about 2,200 cP at a temperature of about 25° C. In another example, the epoxy resin can have a viscosity from about 1 cP to about 125 cP, about 125 cP to about 275 cP, about 275 cP to about 525 cP, about 525 cP to about 725 cP, about 725 cP to about 1,100 cP, about 1,100 cP to about 1,600 cP, about 1,600 cP to about 1,900 cP, or about 1,900 cP to about 2,200 cP at a temperature of about 25° C. In another example, the epoxy resin can have a viscosity from about 1 cP to about 45 cP, about 45 cP to about 125 cP, about 125 cP to about 550 cP, about 550 cP to about 825 cP, about 825 cP to about 1,100 cP, about 1,100 cP to about 1,600 cP, or about 1,600 cP to about 2,200 cP at a temperature of about 25° C. The viscosity of the epoxy resin can also be from about 500 cP, about 1,000 cP, about 2,500 cP, about 5,000 cP, or about 7,000 cP to about 10,000 cP, about 12,500 cP, about 15,000 cP, about 17,000 cP, or about 20,000 cP at a temperature of about 25° C. In another example, the epoxy resin can have a viscosity from about 1,000 cP to about 12,000 cP, about 2,000 cP to about 11,000 cP, about 4,000 cP to about 10,500 cP, or about 7,500 cP to about 9,500 cP at a temperature of about 25° C. The viscosity of the epoxy resin can also be from about 500 cP, about 1,000 cP, about 2,500 cP, about 5,000 cP, or about 7,500 cP to about 10,000 cP, about 15,000 cP, about 20,000 cP, about 30,000 cP, or about 75,000 cP at a temperature of about 150° C. For example, the epoxy resin can have a viscosity from about 750 cP to about 60,000 cP, about 1,000 cP to about 35,000 cP, about 4,000 cP to about 25,000 cP, about 8,000 cP to about 16,000 cP, or about 10,000 cP to about 12,000 cP at a temperature of about 150° C.

According to one or more embodiments, the epoxy resin can have pH from a low of about 1, about 2, about 3, about 4, about 5, about 6, about 7 to a high of about 8, about 9, about 10, about 11, about 12, or about 13. For example, the epoxy resin can have a pH from about 1 to about 2.5, about 2.5 to about 3.5, about 3.5 to about 4.5, about 4.5 to about 5.5, about 5.5 to about 6.5, about 6.5 to about 7.5, about 7.5 to about 8.5, about 8.5 to about 9.5, about 9.5 to about 10.5, about 10.5 to about 11.5, about 11.5 to about 12.5, or about 12.5 to about 13.

Methods for coating proppant particulates with resins and/or epoxy resins are well known to those of ordinary skill in the art, for instance see U.S. Pat. No. 2,378,817 to Wrightsman, U.S. Pat. No. 4,873,145 to Okada and U.S. Pat. No. 4,888,240 to Graham, the entire disclosures of which are incorporated herein by reference.

According to one or more embodiments, the filter cake breaker 104 and/or the inducer is mixed with or otherwise added to the resin coating 202 prior to coating the substrate particle 102 with the resin coating 202. For example, the filter cake breaker 104 and/or the inducer can be homogenously mixed with the coating 202 prior to coating the substrate particle 102 with the coating 202.

According to several exemplary embodiments, the coating 202 can be or include a degradable coating. Specifically, as the coating degrades, the filter cake breaker 104 and/or the inducer mixed with the coating 202, disposed between the coating 202 and the substrate particle 102, and/or infused into the substrate particle 102 can be released into the surrounding fluid(s) and into contact with an adjacent filter cake. The amount and molecular weight of the degradable coating 202 can be varied to provide for longer or shorter degrade times and tailored release of the filter cake breaker 104 and/or the inducer.

According to certain embodiments, the degradable coating 202 can include one or more of water-soluble polymers and cross-linkable water-soluble polymers. Suitable water-soluble polymers and cross-linkable water-soluble polymers are disclosed in U.S. Pat. No. 6,279,656, the entire disclosure of which is incorporated herein by reference. According to several exemplary embodiments in which the degradable coating 202 includes one or more of water-soluble polymers and cross-linkable water-soluble polymers, the solubility parameters of such polymers can be controlled to adjust the timing of the solubility or degradation of the coating 202. Such parameters can include molecular weight, the hydrophilic/lipophilic balance of the polymers, and the extent of cross-linking of the polymers. According to several exemplary embodiments, the degradable coating 202 includes a degradable polymer such as polylactic acid, cellulose acetate, methyl cellulose or combinations thereof that can degrade upon contact with fluids, over time, to allow for the release of the filter cake breaker 104 and/or the inducer at different time intervals.

According to one or more exemplary embodiments, the degradable coating 202 can degrade in any suitable manner. For example, the degradable coating 202 can degrade from the outside-in, such that the outer surface of the coating 202 degrades first, resulting in controlled release of the filter cake breaker 104 and/or the inducer blended with the coating 202. These degradable coating coatings 202 can include self-polishing coatings. The self-polishing coatings can include self-polishing copolymers having chemical bonds that are gradually hydrolyzed by water, such as produced water, seawater, and/or saltwater. The self-polishing coating can release the filter cake breaker 104 and/or the inducer gradually, over time, due to the nature of the degradation of the coating 202 from its outermost surface towards its innermost surface, the degradation caused by the coating being gradually hydrolyzed by water.

The gravel pack particle 100, 200 can have any suitable apparent specific gravity. In one or more embodiments, the gravel pack particle 100, 200 can have an apparent specific gravity less than 3.5 g/cc, less than 3.3 g/cc, less than 3.2 g/cc, less than 3 g/cc, less than 2.7 g/cc, less than 2.5 g/cc, or less than 2.3 g/cc. The gravel pack particle 100, 200 can have an apparent specific gravity of about 1.25 g/cc, about 1.45 g/cc, about 1.65 g/cc, or about 1.85 g/cc to about 1.95 g/cc, about 2 g/cc, about 2.1 g/cc, about 2.2 g/cc, or about 2.4 g/cc or more. For example, the gravel pack particle 100, 200 can have an apparent specific gravity of about 1.5 g/cc to about 2.5 g/cc, about 1.8 g/cc to about 2.4 g/cc, about 2.6 g/cc to about 3.1 g/cc, or about 2.8 g/cc to about 3.4 g/cc. In one or more exemplary embodiments, the gravel pack particle 100, 200 has an apparent specific gravity less than the apparent specific gravity of the substrate particle 102. The apparent specific gravity of the gravel pack particle 100, 200 can be less than 95%, less than 90%, less than 85%, less than 80%, less than 75%, or less than 70% of the apparent specific gravity of the substrate particle 102.

The gravel pack particle 100 can be provided using any suitable method of manufacture. The substrate particle 102 can be coated and/or infused with the filter cake breaker 104 and/or the inducer. In one or more embodiments, the substrate particle 102 can be infused with the filter cake breaker 104 and/or the inducer using microwave blending, vacuum infusion, thermal infusion, capillary action, solid state extrusion, ribbon blending at room or elevated temperature, or pug mill processing, or any combination thereof. For example, the substrate particle 102 can be heated by any suitable method and heat from the heated substrate particle 102 can be used to heat the filter cake breaker 104 to a temperature from about 140° C., about 150° C., or about 160° C. to about 170° C., about 185° C., about 200° C., or about 225° C. to melt or soften the solid phase filter cake breaker 104 to a viscosity sufficient to enter the pores and interstitial spaces of the substrate particle 102 via capillary pressure. The substrate may be heated to a temperature from about 70° F. to about 500° F., about 200° F. to about 475° F., or about 300° F. to about 450° F. For example, the substrate may be heated to about 450° F. The heater may be or include a bulk solid heater with a direct and/or indirect flame carousel. In other embodiments, a Solex heater and/or a fluid bed may also or instead be used to heat the substrate. Certain methods for infusing porous ceramic particulates with chemical treatment agents are well known to those of ordinary skill in the art, such as those disclosed in U.S. Pat. Nos. 5,964,291 and 7,598,209, the entire disclosures of which are incorporated herein by reference. The gravel pack particle 200 can be provided by coating the gravel pack particle 100 with the coating materials described herein.

Figure 3:
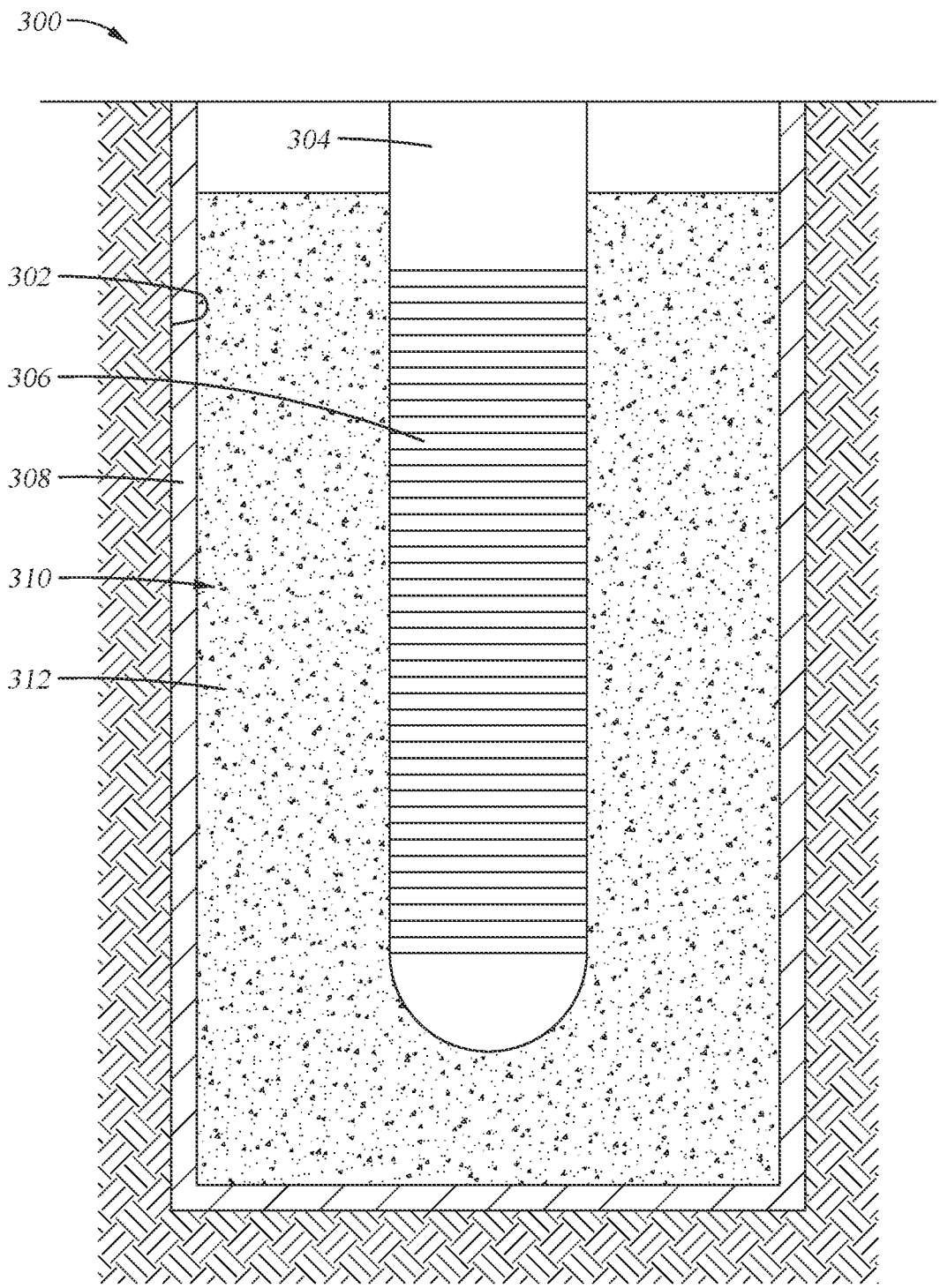
FIG. 3 illustrates a partial cut-away, side view of an openhole gravel pack assembly containing gravel pack particles in contact with a filter cake, according to an embodiment.

FIG. 3 illustrates a partial cut-away, side view of an openhole gravel pack assembly 300 containing gravel pack particles in contact with a filter cake 308. As shown in FIG. 3, the gravel pack assembly 300 can include an open hole 302 and a tubular 304. The tubular 304 can be axially aligned within the open hole 302, resulting in an annular space 312 situated between the tubular 304 and the open hole 302. The tubular 304 can have a perforated section (not shown) and at least a portion of the perforated section can be surrounded by a screen 306. For example, the screen 306 can be circumferentially disposed about the perforated section and axially aligned with tubular 304. The gravel pack particles 308 can be at least partially located in the annular space 312, between the screen 306 and the filter cake 308. The filter cake 308 can be disposed between and adjacent to the open hole 302 and the gravel pack particles 310, preventing fluid communication between the subterranean formation and the gravel pack particles 310. The gravel pack particles 310 can include the gravel pack particles 100, 200. For example, the gravel pack particles can include a blend of a first portion of gravel pack particles 100, 200 containing the filter cake breaker 104 and a second portion of gravel pack particles 100, 200 containing the inducer.

The gravel pack assembly 300 can be located in any suitable vertical or horizontal wellbore. A longitudinal axis of the gravel pack assembly 300 can have any suitable orientation with respect to vertical. For example, the longitudinal axis of the tubular 304 can be substantially vertically oriented or substantially horizontally oriented. In one or more exemplary embodiments, the gravel pack assembly 300 can be located in a vertical portion, deviated portion, and/or horizontal portion of wellbore.

The gravel pack particles described herein combine the benefits of gravel pack transport and placement with the ability to remove filter cake material under a variety of conditions, thereby maximizing oil and/or gas production in openhole wells. The lightweight nature of the gravel pack particles disclosed herein results in a lower settling rate, thereby allowing these gravel pack particles to have enhanced transport characteristics. Other oilfield applications that may benefit from the gravel pack particles disclosed herein may include horizontal gravel packs, vertical frac and packs, and horizontal frac and packs, where the lightweight nature of the gravel pack particles may minimize the risk of premature screenout and increase frac length and height.

In operation, a gravel pack containing a blend of inducer containing gravel pack particles and filter cake breaker containing gravel pack particles can degrade or dissolve the filter cake 308. For example, the blend of gravel pack particles can include one or more gravel pack particles that include the inducer infused into the porosity of a substrate to provide inducer containing gravel pack particles. The inducer containing gravel pack particles can be coated or uncoated. The inducer containing gravel pack particles can be configured to elute the inducer therefrom upon contact with a well fluid, such as water. The eluted inducer can then contact the filter cake breaker containing gravel pack particles, thereby causing the inducibly degradable material to degrade. In certain embodiments, the polyacetal present in the inducibly degradable material can degrade in the presence of sulfur dioxide and water and/or sulfurous acid generated by reaction of the sulfur dioxide with water to form formaldehyde. In certain embodiments, the formaldehyde can react with water and sulfur dioxide present in the wellbore environment to form an alpha hydroxy sulfonic acid, which can degrade the filter cake 308 may further induce the degradation of the inducibly degradable material to further degrade the filter cake 308.

As used herein, the terms "inner" and "outer"; "up" and "down"; "upper" and "lower"; "upward" and "downward"; "above" and "below"; "inward" and "outward"; "uphole" and "downhole"; and other like terms as used herein refer to relative positions to one another and are not intended to denote a particular direction or spatial orientation. The terms "couple," "coupled," "connect," "connection," "connected," "in connection with," and "connecting" refer to "in direct connection with" or "in connection with via one or more intermediate elements or members."

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:
1. A gravel pack particle, comprising:
   a substrate particle having an internal interconnected porosity of about 10% to about 70%; and
   a filter cake breaker coated on the substrate particle, the filter cake breaker selected from the group consisting of esters, aliphatic polyesters, ortho esters, poly (ortho esters), ortho ethers, poly (ortho ethers), lactides, poly (lactides), glycolides, poly(glycolides), lactones, hydroxybutyrates, poly(hydroxybutyrates), anhydrides, poly(anhydrides), polyascorbic acids, aliphatic carbonates, aliphatic polycarbonates, amino acids, poly(amino acids), ethylene oxide, poly(ethylene oxide), polyphosphazenes, and combinations thereof.
2. The gravel pack particle of claim 1, wherein the filter cake breaker is selected from the group consisting of poly (ortho esters), poly (ortho ethers), poly(lactides), poly(glycolides), poly(hydroxybutyrates), poly(anhydrides), polyascorbic acids, aliphatic polycarbonates, poly(amino acids), poly(ethylene oxide), polyphosphazenes, and combinations thereof.

3. The gravel pack particle of claim 1, wherein the filter cake breaker is selected from the group consisting of polyascorbic acids, poly(amino acids), and combinations thereof.

4. The gravel pack particle of claim 1, wherein the filter cake breaker is an acid selected from the group consisting of citric acid, oleic acid, tartaric acid, stearic acid, linoleic acid, linolenic acid, aromatic dicarboxylic acids, oxalic acid, malonic acid, succinic acid, glutaric acid, glutamic acid, boric acid, adipic acid, a diacid, a triacid, and a tetraacid, and combinations thereof.

5. The gravel pack particle of claim 4, wherein the filter cake breaker is an acid selected from the group consisting of methylglycinediacetic acid (MGDA), ethylenediaminetetraacetic acid (EDTA), hydroxyl-ethylenediaminetetraacetic acid (HEDTA), and combinations thereof.

6. The gravel pack particle of claim 1, wherein the filter cake breaker is an alcohol having at least 8 carbon atoms.

7. The gravel pack particle of claim 1, wherein the substrate particle is selected from the group consisting of ceramic proppant, diatomaceous earth, walnut hulls, glass beads, sand, plastic beads, and combinations thereof.

8. The gravel pack particle of claim 1, further comprising a polymeric coating coated onto the substrate particle.

9. The gravel pack particle of claim 8, wherein the filter cake breaker is mixed with the polymeric coating.

10. The gravel pack particle of claim 1, wherein the substrate particle has:
   an apparent specific gravity of about 1.6 g/cc to about 3.8 g/cc;
   a bulk density of about 1.3 g/cc to about 1.8 g/cc;
   an average pore size of about 3 nm to about 30,000 nm in its largest dimension; and
   a particle size of about 115 mesh to about 2 mesh.

11. the gravel pack of claim 1, wherein the filter cake breaker is disposed within the internal interconnected porosity.

* * * * *